United States Patent
Malkin et al.

(10) Patent No.: US 9,363,426 B2
(45) Date of Patent: Jun. 7, 2016

(54) AUTOMATIC CAMERA SELECTION BASED ON DEVICE ORIENTATION

(71) Applicant: International Business Machines Corporation, Armonk, NY (US)

(72) Inventors: Peter K. Malkin, Yorktown Heights, NY (US); Calvin B. Swart, Poughkeepsie, NY (US); Jessica J. Tran, Renton, WA (US); Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/290,538

(22) Filed: May 29, 2014

(65) Prior Publication Data

US 2015/0350505 A1  Dec. 3, 2015

(51) Int. Cl.
*H04N 5/228* (2006.01)
*H04N 5/225* (2006.01)
*G03B 5/06* (2006.01)

(52) U.S. Cl.
CPC ................ *H04N 5/2257* (2013.01); *G03B 5/06* (2013.01)

(58) Field of Classification Search
CPC .................................................... H04N 5/2257
USPC ..................................................... 348/208.16
See application file for complete search history.

(56) References Cited

U.S. PATENT DOCUMENTS

| | | | |
|---|---|---|---|
| 6,148,149 A | 11/2000 | Kagle | |
| 7,054,552 B2 | 5/2006 | Konttinen | |
| 7,561,191 B2 | 7/2009 | May et al. | |
| 7,724,296 B2 | 5/2010 | Loenn | |
| 8,217,964 B2 | 7/2012 | Laine et al. | |
| 2007/0296820 A1* | 12/2007 | Lonn | 348/207.99 |
| 2009/0002797 A1 | 1/2009 | Kwong et al. | |
| 2010/0194860 A1 | 8/2010 | Mentz et al. | |
| 2011/0249078 A1 | 10/2011 | Abuan et al. | |
| 2012/0057064 A1 | 3/2012 | Gardiner et al. | |
| 2012/0113216 A1 | 5/2012 | Seen et al. | |
| 2012/0140019 A1 | 6/2012 | Jung et al. | |
| 2012/0149432 A1 | 6/2012 | Lablans | |
| 2012/0229380 A1* | 9/2012 | Silvester | 345/158 |
| 2012/0293680 A1 | 11/2012 | Guan | |

(Continued)

FOREIGN PATENT DOCUMENTS

WO    WO2012053940    4/2012

OTHER PUBLICATIONS

IBM, "Adaptive Automatic Determination of Picture Orientation Using Data Mining Methodology", Sep. 1, 2002, pp. 1-5.

(Continued)

*Primary Examiner* — Usman Khan
(74) *Attorney, Agent, or Firm* — Scully, Scott, Murphy & Presser, P.C.; Nidhi G. Kissoon

(57) ABSTRACT

At least two camera lenses on a mobile may be provided. The camera lenses may be configured to face the same or substantially the same direction, at least one of the two camera lenses positioned along one edge of the mobile device and at least another one of the two camera lenses positioned along another edge. Automatic selection of a camera lens among said at least two camera lenses for activation may be enabled based on detecting the current orientation of the mobile device.

20 Claims, 7 Drawing Sheets

(56) References Cited

U.S. PATENT DOCUMENTS

2013/0182139 A1* 7/2013 Brunner ............... G06K 9/3208
348/222.1
2014/0098197 A1* 4/2014 Geris et al. ...................... 348/48

OTHER PUBLICATIONS

Wang, J. et al., "Orientation-Aware Scene Understanding for Mobile Cameras", ACM Ubicomp's 12, Pittsburgh, USA, Sep. 5-8, 2012, pp. 1-10.

* cited by examiner

US 9,363,426 B2

AUTOMATIC CAMERA SELECTION BASED ON DEVICE ORIENTATION

FIELD

The present application relates generally to mobile devices such as mobile phones, and more particularly to automatic camera selection based on device orientation.

BACKGROUND

Devices such as mobile phones and tablets are equipped with a camera. However, generally, a device contains only a single camera on a single edge facing in a given direction. Hence, the position of the lenses may be off center for one of the device orientations.

BRIEF SUMMARY

A method of providing an automatic camera selection based on device orientation, in one aspect, may comprise providing at least two camera lenses on a mobile device, the two camera lenses configured to face the same or substantially the same direction, at least one of the two camera lenses positioned along one edge of the mobile device and at least another one of the two camera lenses positioned along another edge of the mobile device. The method may also comprise enabling automatic selection of a camera lens among said at least two camera lenses for activation based on detecting a current orientation of the mobile device.

A mobile device, in one aspect, may comprise a processor and at least two camera lenses configured to face the same or substantially the same direction and positioned along one edge of the mobile device and at least another one of the two camera lenses positioned along another edge of the mobile device. The mobile device may also comprise an application programming interface operable to automatically select a camera lens among said at least two camera lenses for activation based on detecting a current orientation of the mobile device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Automatic camera selection based on device orientation is described. In one embodiment, multiple camera lenses, e.g., at least two camera lenses may be provided on a mobile device such as a mobile phone. One camera lens (e.g., also referred to as a first camera lens only for purposes of referring to one of the camera lenses) is positioned near the top and centered on one edge of the mobile device (e.g., also referred to as a first edge only to refer to one of the edges of the mobile device). Another camera lens (e.g., also referred to as a second camera lens only for purposes of referring to another camera lens) is positioned near the top and centered on another edge of the mobile device (also referred to as a second edge only for purposes of referring to another edge) that is a different edge from the first edge. The first edge and the second edge may be adjacent edges of the mobile device. The first camera lens and the second camera lens face the same direction. Depending on the orientation of the mobile device, the mobile device (e.g., via an application or operating system running on the device) selects between the two camera lenses, e.g., used to capture video or a picture.

As mobile devices such as phones currently only have a single camera on a single edge facing a given direction, the position of the lens will be off center for one of the phone orientations. Allowing at least two camera lenses to be configured or positioned on different edges, and automatically selecting one camera lens to be activated based on the current orientation the mobile device, e.g., how it is held or positioned, may ensure that a photo or video captured by the mobile device is automatically centered on a target regardless of the change in the mobile device's orientation or in what position the mobile device is held.

Figure 1:
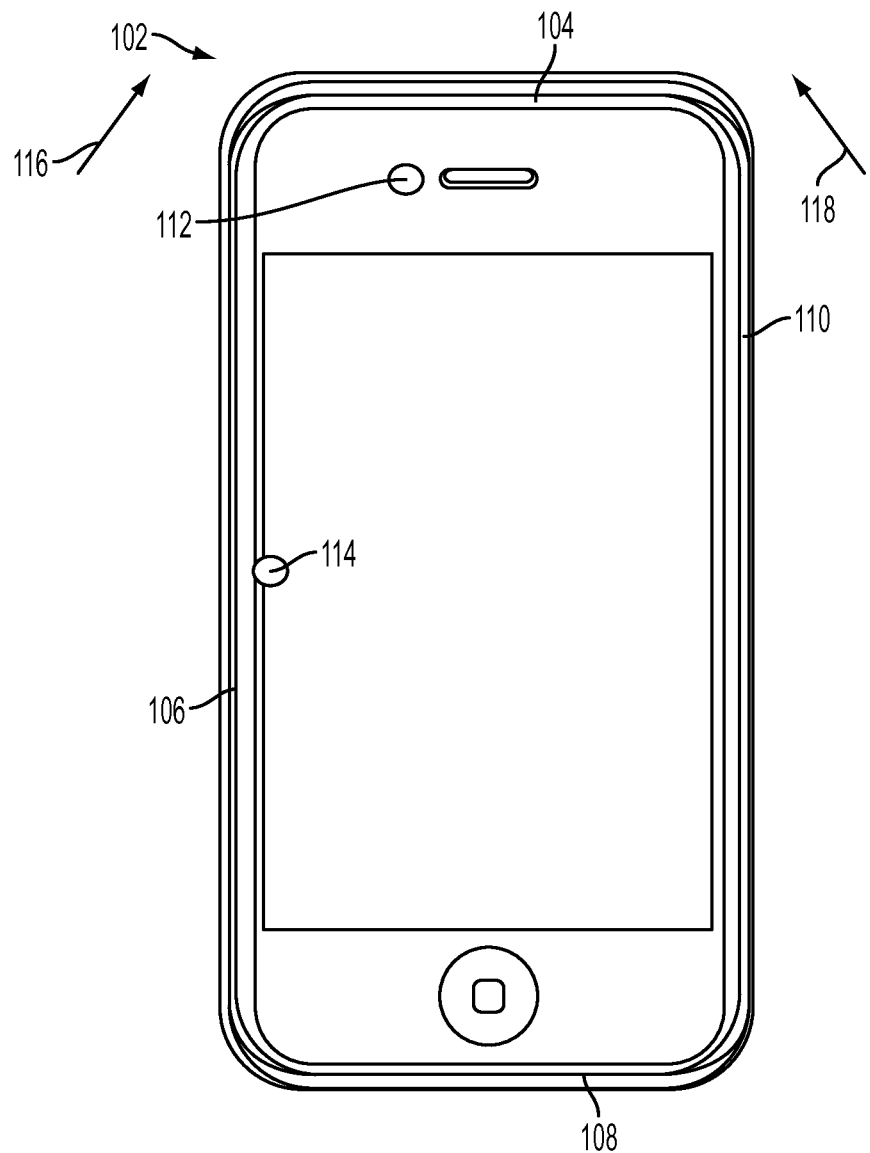
FIG. 1 illustrates an example of a mobile device, a mobile phone, with two cameras configured on the device, in one embodiment of the present disclosure.

FIG. 1 illustrates an example of a mobile device, a mobile phone, with two cameras configured on the device, in one embodiment of the present disclosure. A mobile device 102 shown has edges 104, 106, 108, 110. Two camera lenses 112, 114 are configured in this example mobile device, one for each orientation (portrait and landscape). One camera lens 112 is positioned on the top of the mobile device along one edge 104. Another camera lens 114 is positioned along another edge 106. The camera lens shown at 112 may be also referred to as a short edge camera since it is positioned on the edge that is shorter than another edge. The camera lens shown at 114 may be also referred to as a long edge camera since it is positioned on the edge that is longer than another edge of the mobile device. A camera lens (e.g., 112) may be positioned within a threshold distance from the edge along which it is position (e.g., 104). Similarly, a camera lens (e.g., 114) may be positioned within the same threshold distance or different threshold distance from the edge along which it is positioned (e.g., 106). The threshold distances or distances may be based on design choice. For example, they may be positioned at the top (e.g., few centimeters from the edge that is considered to be the top). For example, if the camera lens is positioned or held in a portrait orientation as shown, the top may be considered along the edge shown at 104. As another example, if the camera is positioned or held in landscape orientation, the top may be considered along the edge shown at 106. The camera lenses 112, 114 may be centered on the respective edges that the camera lenses are positioned, e.g., center of the edge 104 or center of the edge 106.

The two camera lenses 112 and 114 both face the same or substantially the same direction, for example, they are both front-facing camera lenses. One of the two camera lenses 112 may be activated based on detecting the current orientation of the mobile device. For example, responsive to detecting that the mobile device's orientation is portrait, one of two camera lenses that is positioned along a shorter edge may be activated, e.g., in the example shown, the camera lens at 112 may be activated. As another example, responsive to detecting that the mobile device's orientation is landscape, a camera lens that is positioned on a longer edge of the mobile device may be activated. In this example, the camera lens at 114 may be activated.

In one aspect, the adjacent edges of the mobile device are perpendicular or substantially perpendicular to one another. For instance, the edge at 104 is perpendicular or substantially perpendicular to the edge at 106. In another aspect, the camera lenses are positioned along two adjacent edges. For example, as shown, the edge at 104 (along which the camera lens 112 is positioned) is adjacent to the edge at 106 (along which the camera lens 114 is positioned).

The mobile device may be also equipped with image sensors, e.g., as in digital cameras.

Yet in another aspect, responsive to detecting that the mobile device is turned by at least a threshold amount, e.g., 45% from the current orientation, activation between camera lenses may be automatically switched. For instance, the mobile device may be turned in clockwise 116 or counterclockwise 118 directions as shown, or in other directions, as to switch the orientation, which could be a position in-between portrait and landscape. Responsive to detecting a motion of the mobile device, activation of the camera lens 112 may be switched to the camera lens 114, and vice versa, depending on the current position of the mobile device.

Just as screens rotate depending on the orientation, one of the two cameras is activated for capturing an image or video (e.g., front facing in this example) depending on the device orientation (portrait or landscape). In this way, the user does not have to worry about how the device is held when using applications involving capturing an image, e.g., a person's face, since the correct camera is activated independent of how the device is held.

Figure 2:
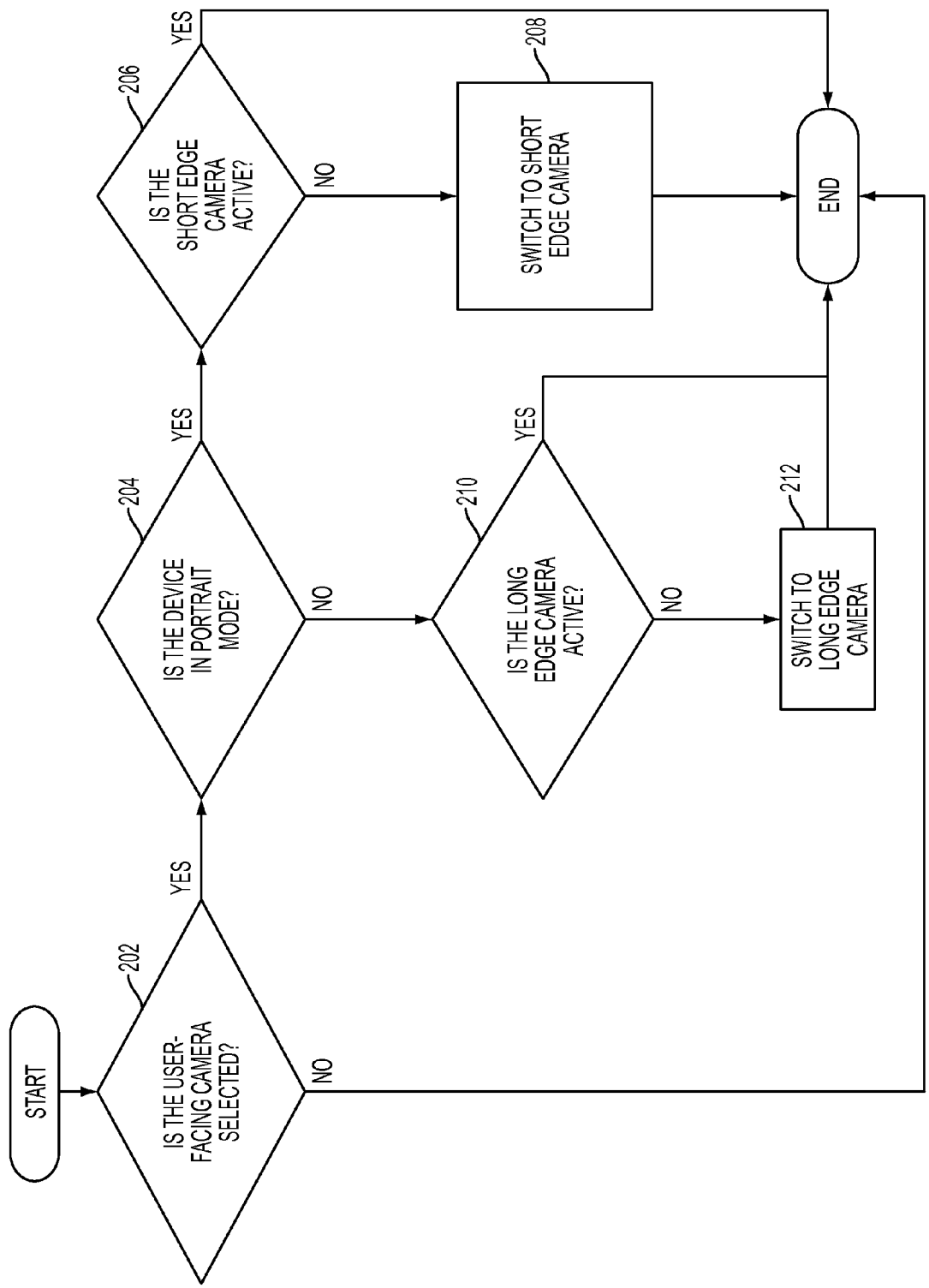
FIG. 2 is a flow diagram that illustrates a method of automatically selecting a camera lens to activate on a mobile device that has two camera lenses configured on it, for example, as shown in FIG. 1.

FIG. 2 is a flow diagram that illustrates a method of automatically selecting a camera lens to activate on a mobile device that has two camera lenses configured on it, for example, as shown in FIG. 1. At 202, it is determined whether a camera is selected, e.g., a camera app or application for activating a camera on the mobile device for taking a photo. If at 202, no user-facing camera is selected, the logic of the flow returns or ends. Briefly, a user-facing camera is one that faces back at one who is viewing the display screen, e.g., of a mobile device (such as a smart phone or smart tablet). While the examples in the present disclosure describe the selection of an optimal user-facing camera, the selection of cameras facing away from the user is also possible. In one aspect, the selection may be restricted to one type of camera at a time, i.e., the selection of one from two or more user-facing cameras in the case where the active cameras are those facing the device user, or the cameras facing in the opposite direction in the case where those cameras are active.

At 204, it is determined whether the device is positioned in portrait mode. For instance, in a mobile device, this may be done by the operating system of the mobile device which determines the orientation of the device, e.g., based on sensor data. The operating system may make this type of data or the determined orientation available to a camera application or a methodology of the present disclosure, for instance, as a function call or orientation change event. So for example, orientation changes may be reported to the camera application by the operating system. In another example, a query function may be made available via which the camera application or an application or device implementing a methodology of the present disclosure can query the operating system for the device orientation data.

In response to determining that the device is positioned in portrait mode, it is determined at 206, whether a camera lens positioned on a shorter edge of the mobile device is active, referred to as a short edge camera (e.g., camera lens at 112 in FIG. 1). If the short edge camera is not active, at 208, the short edge camera is activated, and the other camera on the longer edge of the mobile device (e.g., camera lens at 114) may be deactivated if currently active.

In response to determining that the device is not positioned in portrait mode at 204, it is determined at 210 whether a camera lens positioned on a longer edge of the mobile device is active, referred to as a long edge camera (e.g., camera lens at 114). If the long edge camera is not active, at 212, the long edge camera is activated, and the other camera on the shorter edge of the mobile device (e.g., camera lens at 112) may be deactivated if currently active.

In one embodiment of the present disclosure, the device's orientation may be continuously monitored, activating the camera lens on the device's long edge when device is in landscape orientation, or the camera lens on the short edge when the device is in portrait orientation.

Figure 3:
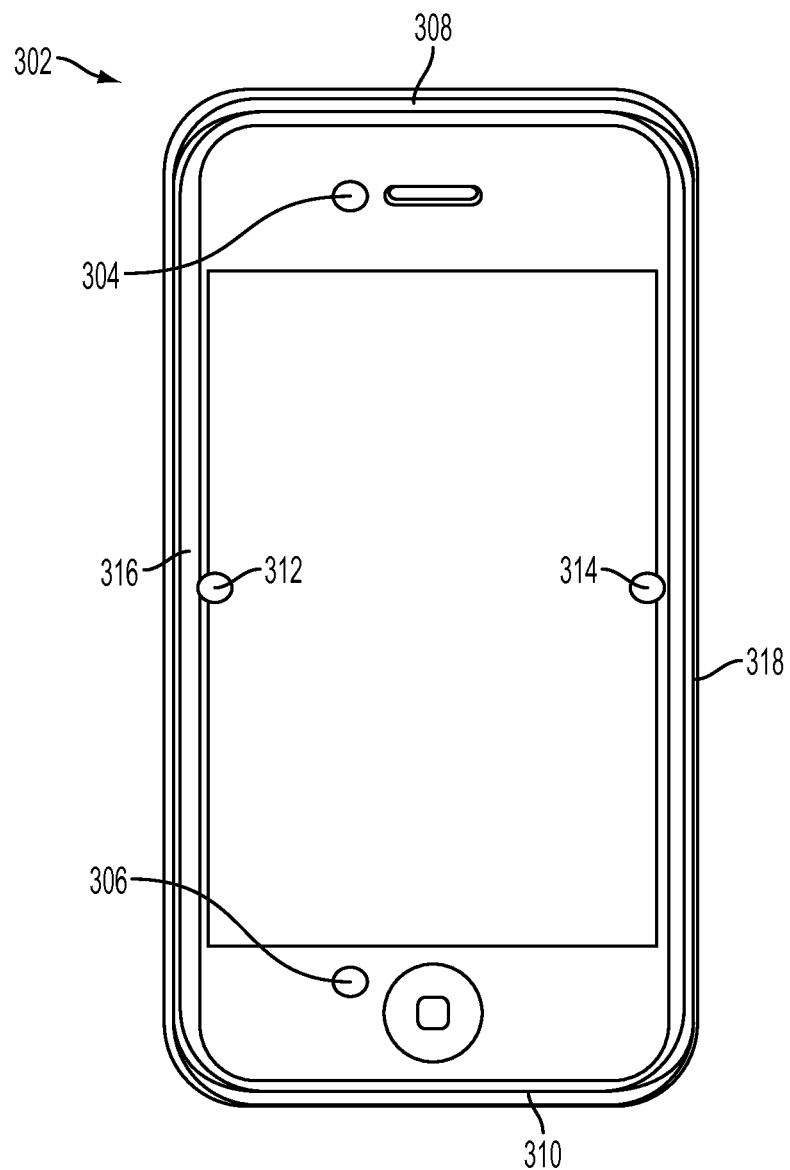
FIG. 3 illustrates an example of a mobile device, a mobile phone, with four cameras configured on the device, in another embodiment of the present disclosure.

FIG. 3 illustrates an example of a mobile device, a mobile phone, with four cameras configured on the device, in another embodiment of the present disclosure. Like in the two camera configuration, camera lenses are positioned along different edges of the mobile device, in this example, one along each of the four edges. The example device 302 has two camera lenses 304 and 306 along the shorter edges 308 and 310 of the device 302, and additional two camera lenses 312 and 314 along the longer edges 316 and 318 of the device 302.

Figure 4:
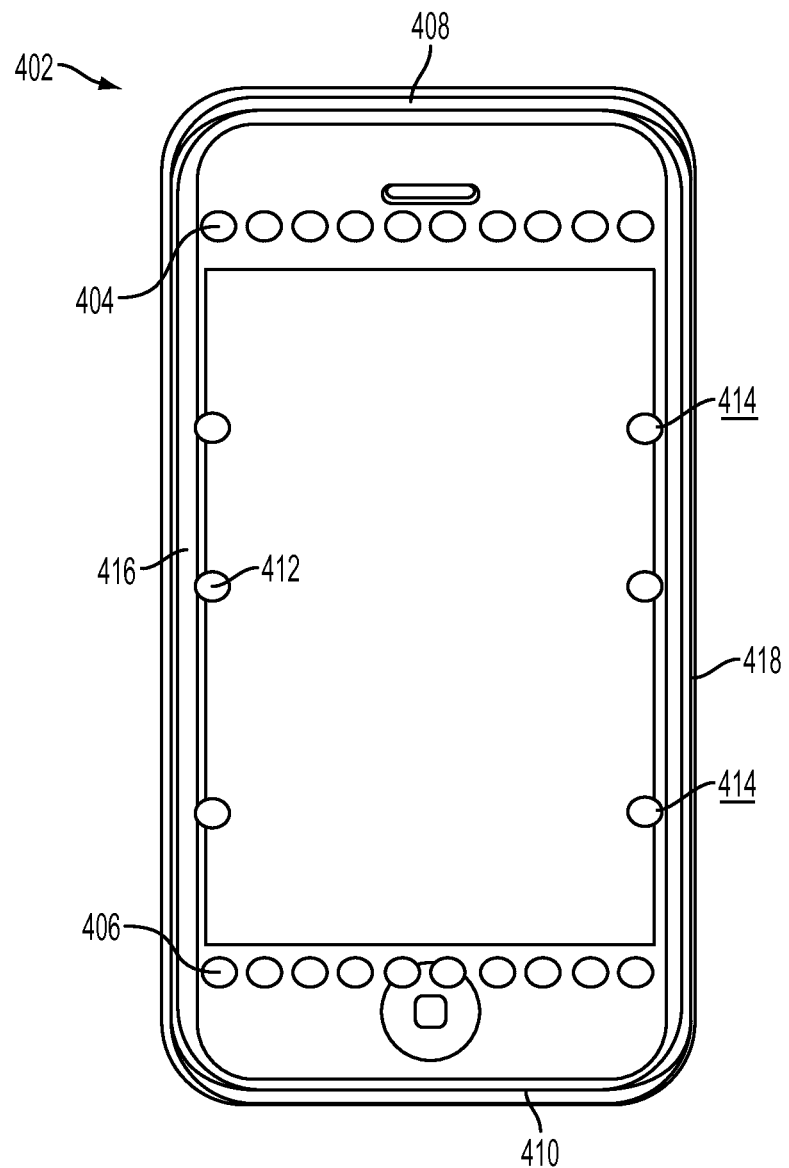
FIG. 4 illustrates an example of a mobile device, a mobile phone, with multiple cameras configured on the device, in yet another embodiment of the present disclosure.

FIG. 4 illustrates an example of a mobile device, a mobile phone, with multiple cameras configured on the device, in yet another embodiment of the present disclosure. In this embodiment, multiple camera lenses are position along each edge of the mobile device 402. For example, there are multiple camera lenses 404 along the edge at 408, multiple camera lenses 406 along the edge at 410, multiple camera lenses 412 along the edge at 416, and multiple camera lenses 414 along the edge at 418.

In the embodiments shown in FIG. 1, FIG. 3 and FIG. 4, the multiple cameras all face the same or the substantially the same direction, e.g., they are shown as front-facing, for capturing images in front of the front side of the mobile device. In another embodiment, the cameras may be all back-facing, for capturing images in the back of the device, e.g., facing back side of the device.

Figure 5:
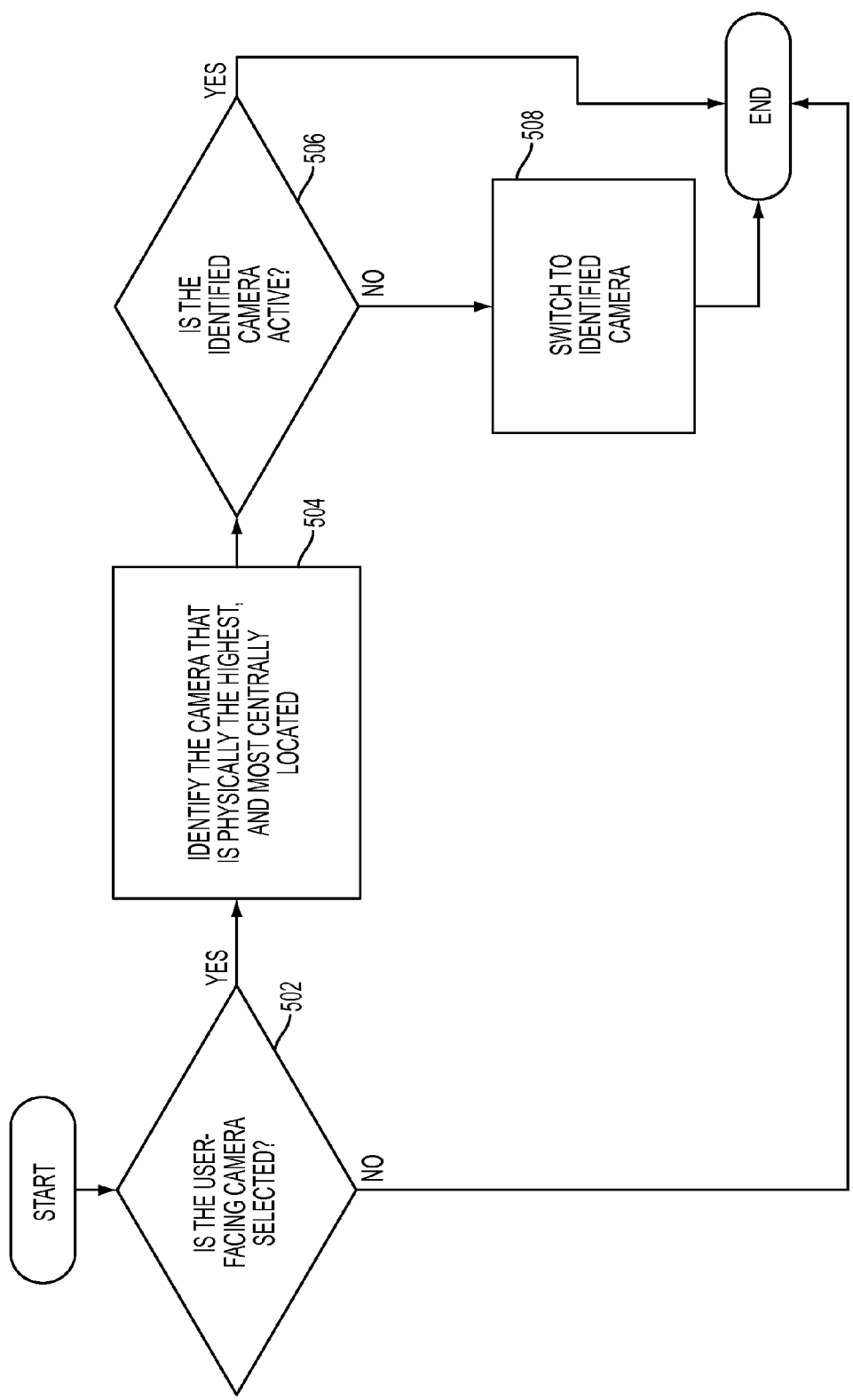
FIG. 5 is a flow diagram illustrating a method for selecting and activating a camera among multiple cameras in a mobile device, for example, mobile devices such as shown in FIG. 3 and FIG. 4.

FIG. 5 is a flow diagram illustrating a method for selecting and activating a camera among multiple cameras in a mobile device, for example, in mobile devices that have more than two cameras, for example, devices such as shown in FIG. 3 and FIG. 4. At 502, it is determined whether a user-facing camera is selected. If at 502, no user-facing camera is selected, the logic of the flow returns or ends. The method may also apply to front-facing cameras. In that case, the logic may restrict the set of cameras under consideration to those cameras facing the currently-selected direction, e.g., front or back.

At 504, if the user-facing camera is selected, a camera lens that is located at physically highest point on the mobile device in its current position than the other camera lenses, and most centrally located on the mobile device may be identified. At 506, it is determined whether the identified camera lens is currently active. If the identified camera lens is already active, the logic of the flow returns or end. If it is determined that the identified camera lens is not currently active, the identified camera lens is activated at 508. This results in the picture or video being captured from a camera view that is as high and as central as possible, relative to the position of the device itself. When the device is being used to capture a person's face, this produces an image where the person appears to be looking more directly at the camera, which is especially valuable in video communication.

In one embodiment of the present disclosure, a camera lens may be automatically identified that is positioned to capture a focal item or aspect of a picture most centrally, e.g., center on the item being captured in a picture. An example may include taking a picture of a person's face. In this example, a camera lens that is positioned to capture the person's face to be at the center of the entire image as much as possible may be identified for activation. This differs from the previous embodiment in that it is effective when the user's face is not vertical, for example the person is lying down.

Figure 6:
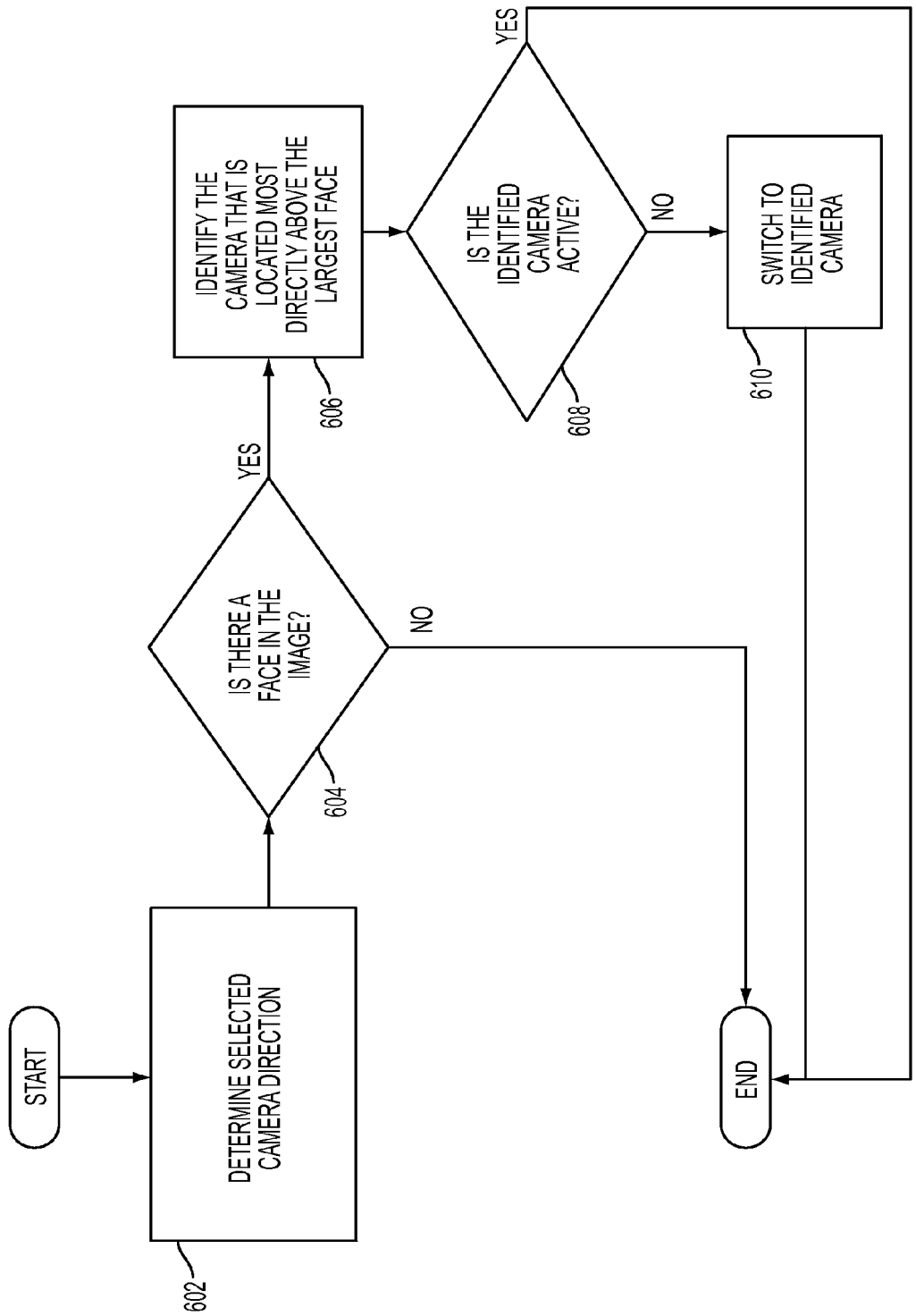
FIG. 6 is a flow diagram illustrating a method for recognizing facial image in one embodiment of the present disclosure.

FIG. 6 is a flow diagram illustrating a method for recognizing facial image in one embodiment of the present disclosure. At 602, it is determined which camera direction is selected. The set of cameras facing the selected direction is identified.

At 604, it is determined whether there is a face (e.g., a person's face) in the image shown through a camera lens (e.g., that is currently active). Any image recognition techniques may be employed to determine the type of image present. If no face is identified in the image, the logic of the flow returns or ends. At 606, if it is determined that there is a face in the image, the camera lens from the set of cameras facing in the same direction that is located most directly above the face in the image, or the largest face in the image may be identified (e.g., if more than one face image is detected). For example, this can be done by identifying parts of the face, e.g., the eyes, nose and mouth of the face. The top of the head is located by projecting a line through the nose and mouth, between the eyes. The physical location on the device where this line meets the edge of the device is determined to be the best camera location. This is calculated by combining information from the device's gyroscope that tells the position and orientation of the device in space, with the projected line information, which also gives a line projected in space. The physical location of each camera on the device may be stored in advance, allowing the nearest camera to be selected. At 608, it is determined whether the identified camera lens is active. If the identified camera lens is already active, the logic of the flow returns or end. If it is determined that the identified camera lens is not active, at 610, the identified camera lens is activated. Previously activated camera lens may be deactivated, if any.

Figure 7:
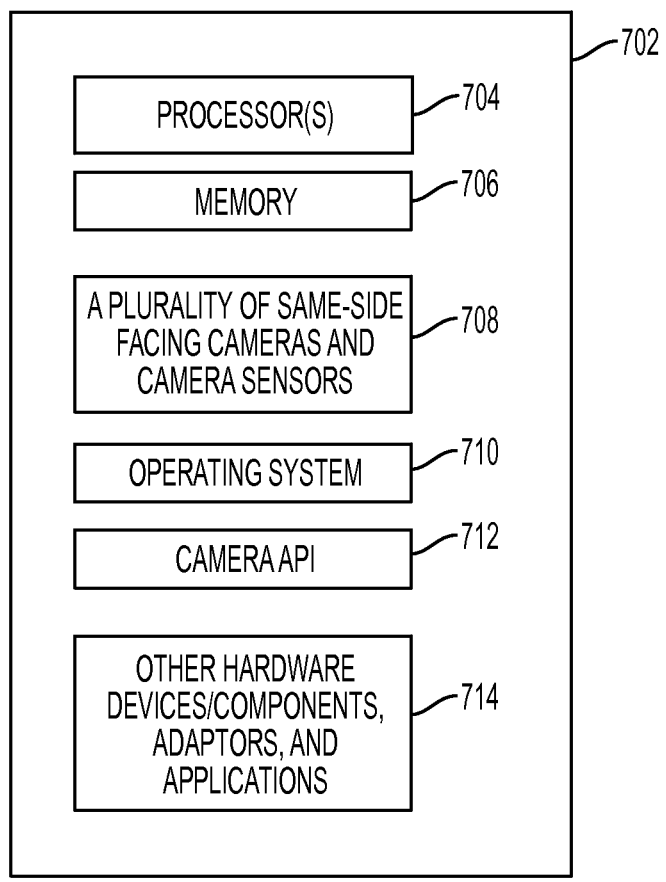
FIG. 7 is a schematic diagram showing example components of a mobile device in one embodiment of the present disclosure.

Examples of mobile devices may include, but are not limited to, cellular telephone, smartphone, laptops, tablets, and others. FIG. 7 is a schematic diagram showing example components of a mobile device. An example mobile device 702 may include one or more processors or processing units 704 and one or more memory devices 706 and/or memory cards, such as volatile memory, e.g., Random Access Memory (RAM) memory devices, and non-volatile memory, e.g., read-only-memory (ROM) memory devices, and other storage devices, one or more network adaptors or device drivers for communications, and other components (e.g., collectively shown at 714). Such mobile devices may also include an operating system 710 that manages the mobile device hardware and services applications. In one aspect, an application programming interface (API) 712 may be provided that interfaces to the camera hardware or components 708 for controlling (e.g., switching active camera or camera lenses) the one or more cameras as described above. For example, the API 712 may provide a function to automatically select a camera lens among a plurality of camera lenses for activation. In one embodiment, the methodology of the present disclosure may utilize this function to activate the desired camera based on detecting the current orientation of the mobile device. In another embodiment, this function may be utilized to activate the desired camera based on detecting the orientation of a face in the current camera image. In another aspect, the methodology of the present disclosure may itself be packaged as a function within this API, used by applications to access the automatic camera selection functionality. For instance, the methodology may be embedded in a camera API.

In the present disclosure, the terms camera and camera lenses are used interchangeably. For instance, there may be a single camera processor connected to a set of lenses; or there may be multiple cameras. Thus, the methodology that selects a camera also applies to selecting a camera lens.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of providing an automatic camera selection based on device orientation, comprising:
providing at least two camera lenses on a mobile device, the two camera lenses configured to face the same or substantially the same direction, at least one of the two camera lenses positioned along one edge of the mobile device and at least another one of the two camera lenses positioned along another edge of the mobile device; and
enabling automatic selection of a camera lens among said at least two camera lenses for activation based on detecting a current orientation of the mobile device,
the automatic selection further comprising, responsive to detecting an image of a face via one of the at least two camera lenses, automatically activating the camera lens that is located most directly above the face in the image, wherein an edge location on the mobile device directly above the face in the image is determined by projecting a line through one or more of a mouth, nose and between eyes in the image to top of the face in the image, and identifying the edge location of the mobile device that meets the line, and the camera lens located nearest to the edge location is activated.

2. The method of claim 1, wherein said at least one of the two camera lenses is positioned within a threshold distance from the one edge, and centered on the one edge.

3. The method of claim 1, wherein said at least another one of the two camera lenses is positioned within a threshold distance from said another edge, and centered on said another edge.

4. The method of claim 1, wherein said enabling automatic selection of a camera lens among said at least two camera lenses for activation based on detecting a current orientation of the mobile device, comprises allowing to monitor mobile device's orientation and responsive to detecting that the mobile device's orientation is portrait, activating one of said at least two camera lenses that is positioned along a shorter of said one edge and said another edge.

5. The method of claim 1, wherein said enabling automatic selection of a camera lens among said at least two camera lenses for activation based on detecting a current orientation of the mobile device, comprises allowing to monitor mobile device's orientation and responsive to detecting that the mobile device's orientation is landscape, activating one of said at least two camera lenses that is positioned along a longer of said one edge and said another edge.

6. The method of claim 1, wherein said one edge is substantially perpendicular to said another edge.

7. The method of claim 1, wherein said one edge is adjacent to said another edge.

8. The method of claim 1, further comprising allowing to monitor mobile device's orientation and in response to detecting that the mobile device is turned at least 45% from the current orientation, automatically switching activation between said at least one of the two camera lenses and said at least another one of the two camera lenses.

9. A mobile device, comprising:
a processor;
at least two camera lenses configured to face the same or substantially the same direction and positioned along one edge of the mobile device and at least another one of the two camera lenses positioned along another edge of the mobile device; and
an application programming interface operable to automatically select a camera lens among said at least two camera lenses for activation based on detecting a current orientation of the mobile device,
the application programming interface is further operable to automatically select the camera lens by, responsive to detecting an image of a face via one of the at least two camera lenses, automatically activating the camera lens that is located most directly above the face in the image, wherein an edge location on the mobile device directly above the face in the image is determined by projecting a line through one or more of a mouth, nose and between eyes in the image to top of the face in the image, and identifying the edge location of the mobile device that meets the line, and the camera lens located nearest to the edge location is activated.

10. The mobile device of claim 9, wherein said at least one of the two camera lenses is positioned within a threshold distance from said one edge, and centered on said one edge.

11. The mobile device of claim 9, wherein said at least another one of the two camera lenses is positioned within a threshold distance from said another edge, and centered on said another edge.

12. The mobile device of claim 9, wherein the application programming interface is operable to monitor mobile device's orientation and responsive to detecting that the mobile device's orientation is portrait, activating one of said at least two camera lenses that is positioned along a shorter of said one edge and said another edge.

13. The mobile device of claim 9, wherein the application programming interface is operable to monitor mobile device's orientation and responsive to detecting that the mobile device's orientation is landscape, activating one of said at least two camera lenses that is positioned on a longer of said one edge and said another edge.

14. The mobile device of claim 9, wherein said one edge is substantially perpendicular to said another edge.

15. The mobile device of claim 9, wherein said one edge is adjacent to said another edge.

16. The mobile device of claim 9, wherein the application programming interface is further operable to monitor mobile device's orientation and in response to detecting the mobile device is turned at least 45% from the current orientation, the application programming interface is further operable to automatically switch activation between said at least one of the two camera lenses and said at least another one of the two camera lenses.

17. The mobile device of claim 9, wherein the mobile device has at least one of the at least two camera lenses configured along each edge of the mobile device.

18. A non-transitory computer readable storage medium storing a program of instructions executable by a machine to perform a method of automatically selecting a camera based on device orientation, the method comprising:
detecting a current orientation of a mobile device, the mobile device configured with at least two camera lenses that face the same or substantially the same direction; and
automatically selecting a camera lens among said at least two camera lenses for activation based on the current orientation of the mobile device,
the automatic selection further comprising, responsive to detecting an image of a face via one of the at least two camera lenses, automatically activating the camera lens that is located most directly above the face in the image, wherein an edge location on the mobile device directly above the face in the image is determined by projecting a line through one or more of a mouth, nose and between eyes in the image to top of the face in the image, and identifying the edge location of the mobile device that meets the line, and the camera lens located nearest to the edge location is activated.

19. The computer readable storage medium of claim 18, wherein the automatically selecting a camera lens comprises, responsive to detecting that the mobile device's orientation is portrait, activating one of said at least two camera lenses that is positioned along a shorter of said one edge and said another edge.

20. The computer readable storage medium of claim 18, wherein the automatically selecting a camera lens comprises, responsive to detecting that the mobile device's orientation is landscape, activating one of said at least two camera lenses that is positioned on a longer of said one edge and said another edge.

* * * * *